Dec. 23, 1941.    C. J. CRANE ET AL    2,266,741
PANORAMIC SEXTANT
Filed March 3, 1941    3 Sheets-Sheet 1

INVENTORS
CARL J. CRANE
THOMAS L. THURLOW
SAMUEL M. BURKA
BY
ATTORNEYS

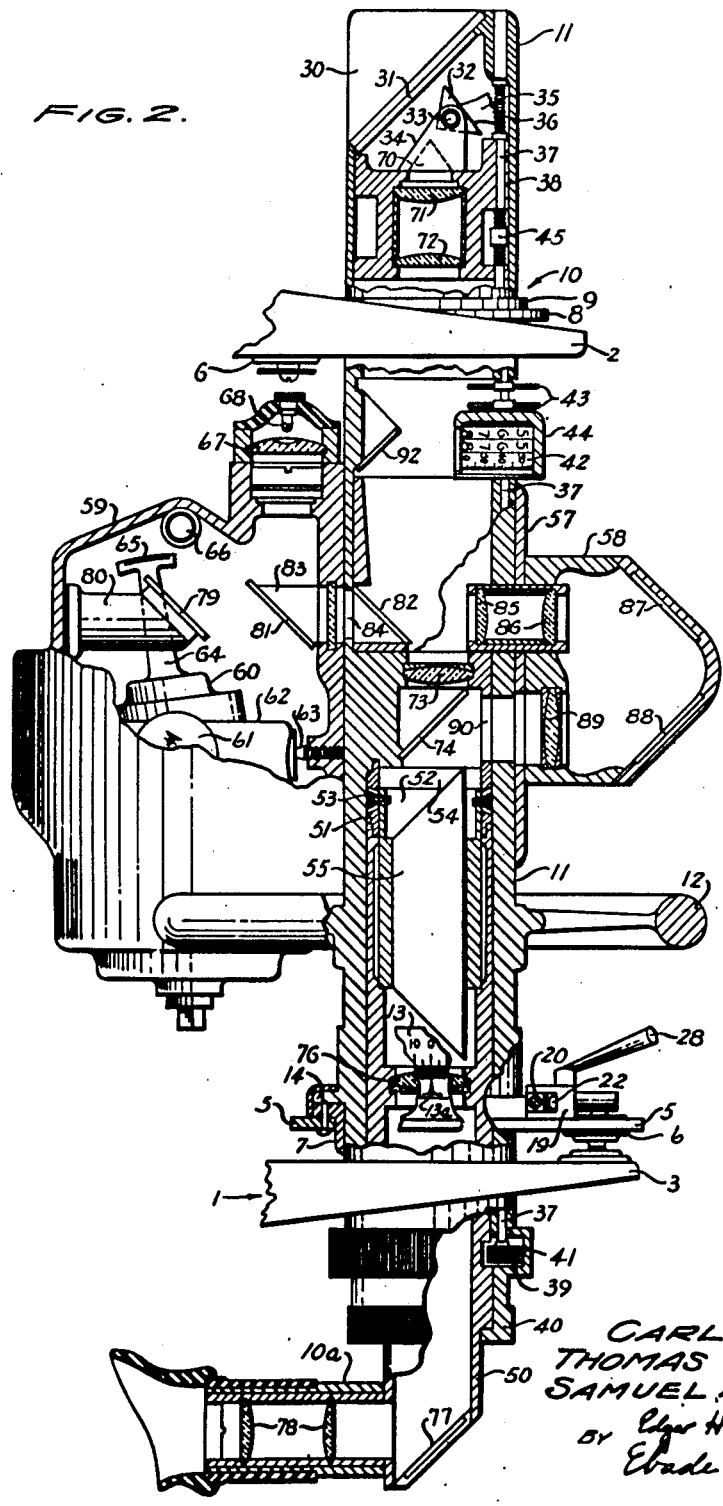

Dec. 23, 1941.   C. J. CRANE ET AL   2,266,741
PANORAMIC SEXTANT
Filed March 3, 1941   3 Sheets-Sheet 3
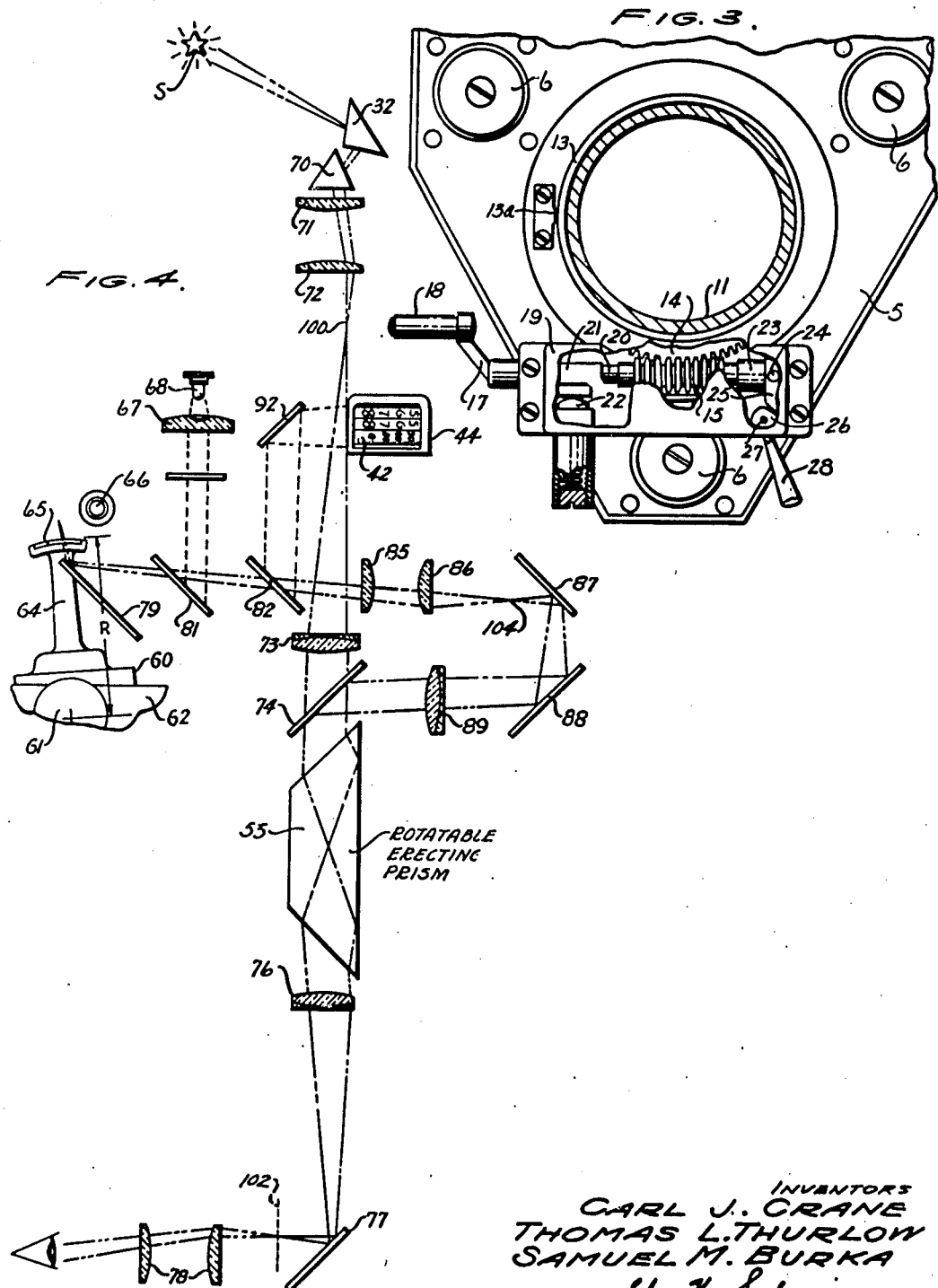
INVENTORS
CARL J. CRANE
THOMAS L. THURLOW
SAMUEL M. BURKA
ATTORNEYS Patented Dec. 23, 1941

2,266,741

UNITED STATES PATENT OFFICE 2,266,741

PANORAMIC SEXTANT

Carl J. Crane, Barksdale Field, La., and Thomas L. Thurlow and Samuel M. Burka, Dayton, Ohio Application March 3, 1941, Serial No. 381,474

10 Claims. (Cl. 88—2.2)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to an improved form of sextant for use in the navigation of aircraft and more particularly relates to a sextant comprising a telescope journalled for rotation in suitable bearings carried by a frame fixed to the aircraft fuselage the telescope having an index mirror or reflecting prism at its upper end which is rotatable about a vertical axis with the telescope and also mounted for rotation about a transverse or horizontal axis and tilted through the medium of a manually controlled screw. The telescope is arranged so that the index reflector may be projected through the upper portion of the aircraft fuselage and the telescope is provided at its lower end with a conventional eyepiece or ocular through which the image of a celestial body may be observed relative to the image of a means constituting an artificial horizon. The means constituting the artificial horizon may be either in the form of an illuminated gyroscopically controlled reticule or an illuminated bubble in a level tube, the image of the artificial horizon being transmitted to the eyepiece or ocular. By rotating the telescope in azimuth about its bearing axis and adjusting the angle of tilt of the index reflector, the image of a celestial body anywhere within the visible celestial hemisphere may be brought within view of the ocular and by adjusting the angle of tilt of the index mirror about the transverse or horizontal axis, the images of the celestial body and the artificial horizon may be superimposed and the angular rotation of the index mirror or reflector about its transverse axis is then a measure of the altitude of the celestial body, optical means being provided for transmitting this indication visually to the eyepiece. The relative azimuth bearing of the celestial body with respect to the longitudinal axis of the aircraft also is suitably indicated by an azimuth scale rotated in unison with the telescope and cooperating with a fixed or stationary index.

In order to eliminate errors due to pitching of the aircraft the optical systems for transmitting the respective celestial body and artificial horizon images to the eyepiece are so designed that the images will shift an equal amount in the same direction so that when once superimposed the measured altitude of the celestial body will not change even though the aircraft is oscillating at the time of the observation.

In order to prevent inversion of the image of the celestial body and the artificial horizon as the telescope is rotated in azimuth an erecting prism is provided which is rotated automatically about its optical axis through an angle equal to one-half of the angular rotation of the telescope, the control of the erecting prism being effected through suitable differential gearing.

A sextant constructed in accordance with the present invention has a special utility on present high speed closed cabin aircraft, since the observation can be made from within the aircraft eliminating the necessity of the observer having to make an observation while exposed to the air stream or through a window as is at present the customary practice.

The principal object of the invention is the provision of a sextant for measuring the altitude of a celestial body located anywhere within the visible celestial hemisphere including a panoramic reflector for receiving light from the celestial body, the reflector being rotatable in azimuth as well as being tiltable about a horizontal axis.

Another object of the invention is the provision of a sextant for measuring the altitude of a celestial body including a telescope having an index reflector for receiving light from a celestial body, said reflector being rotatable in azimuth about a vertical axis and tiltable about a horizontal axis to form a panoramic reflector, an ocular associated with said telescope, an artificial horizon associated with said telescope, and separate optical systems for transmitting the images of said celestial body and said artificial horizon to said ocular, the angular rotation of the reflector about a horizontal axis necessary to cause superimposition of the respective images being a measure of the altitude of the celestial body.

A further object of the invention is the provision in a panoramic sextant of the character described of rotatable optical means actuated by relative rotation of the index reflector and the ocular to maintain the images of the celestial body and the artificial horizon continuously erect.

Another object of the invention is the provision in a sextant having a panoramic reflector for receiving light from a celestial body and means constituting an artificial horizon, of optical systems for forming images of said body and said horizon visible through an ocular forming a part of the sextant, the said optical systems being so designed that the images will shift an equal amount in the same direction due to pitching motion of the sextant as a unit.

Other objects of the invention not specifically enumerated above will become apparent by reference to the detailed description hereinafter given taken in conjunction with the appended drawings in which:

Figure 2 is a view partly in section illustrating the detailed construction of the device of Figure 1.

Figure 3 is a sectional plan view of a detail of the sextant taken on line 3—3 of Figure 1.

Figure 4 is a diagrammatic view illustrating the elements constituting the optical systems for transmitting the images to the eyepiece.

Figure 1:
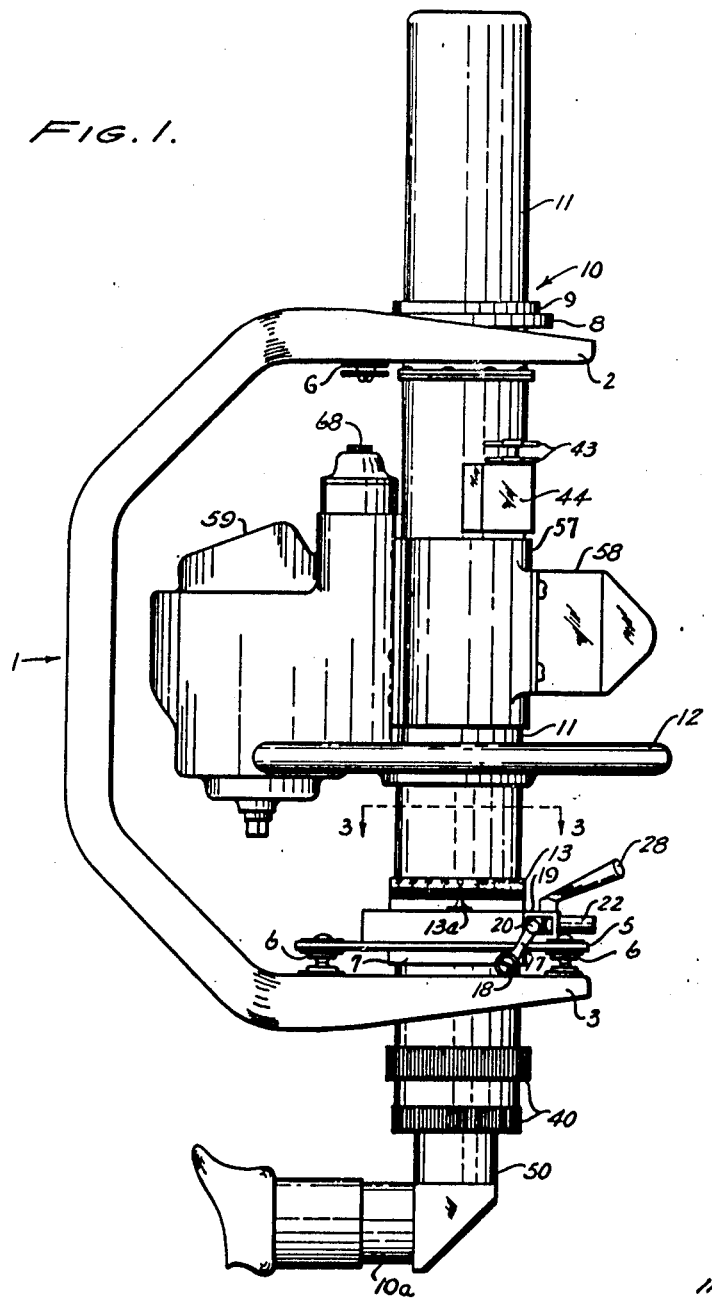
Figure 1 illustrates a side elevation of a sextant made in accordance with the invention.

Referring now to Figure 1, the reference numeral 1 generally indicates a U shaped frame adapted to be rigidly mounted within an aircraft cabin or fuselage, and having a horizontal extending upper leg 2 and a corresponding horizontal extending lower leg 3. The lower leg 3 has a triangular plate 5 mounted thereon by means of the resilient rubber mountings 6, the plate serving as a support for a bearing journal 7, and similarly the plate member 8 supporting a journal bearing 9 is secured to the upper leg 2 of the frame but by a single resilient mounting 6 of the same type as employed in supporting the plate 5. The journal bearings 7 and 9 serve as a journal for the telescope tube 11 of the telescope generally indicated by the reference numeral 10, the upper portion of the telescope tube 11 being adapted to be projected through the roof or upper portion of the aircraft fuselage, and the lower portion of the telescope having a conventional eyepiece or ocular 10a associated therewith for visual observation of the image of a celestial body relative to the image of an element forming an artificial horizon. The telescope 10 is adapted to be angularly rotated in azimuth in the journal bearings 7 and 9 by means of a handwheel 12, the angular rotation of the telescope relative to the longitudinal axis of the airplane being indicated by angular movement of an azimuth scale 13 carried by the tube 11 relative to a stationary pointer or index 13a. The housing 59 rotatable with the telescope tube 11 serves as an enclosure for means constituting an artificial horizon as hereinafter more particularly described. Detailed construction of the telescope and its associated mechanism will now be described.

Referring to Figure 2, adjacent the portion of the tube 11 journalled in the bearing 7, there is provided a gear 14 formed integral with the tube 11 and as seen in Figure 3 meshes with a worm 15 adapted to cause a vernier angular adjustment of the telescope tube 11 in its journal bearings 7 and 9. Worm 15 is enclosed in a housing 19 supported on the stationary mounting plate 5 and the worm is actuated by means of a crank 17 and crank handle 18 secured on the outer end of a shaft 20 on which the worm 15 is rigidly mounted. At its outer end the shaft is journalled in a bearing block 21 slidably mounted in the casing 19 (Figure 2) and is urged inwardly by means of a spring-pressed plunger 22 so as to bring the worm 15 into meshing engagement with the teeth of the gear 14. The shaft 20 is journalled at its inner end in a bearing 23 which is pivotally mounted on a pivot 24 to rotate about a vertical axis, the bearing being provided with an arm 25 serving as a cam follower and adapted to be engaged by a cam 26 rotatably mounted on a vertical pivot 27 and adapted to be actuated about its pivotal axis by means of a lever 28. Upon clockwise rotation of the lever 28, the cam 26 will engage the cam follower 25 and rotate the journal bearing 23, shaft 20 and worm 15 about the pivot 24 to disengage the worm 15 from the gear 14, the bearing block 21 compressing the spring-pressed plunger 22. Upon the disengagement of the worm 15 from the gear 14, the telescope tube 11 may be manually rotated by means of the handwheel 12 (Figure 2) and upon the counterclockwise rotation of the handle 28, the spring-pressed plunger 22 will cause the worm 15 to engage the gear 14 and a vernier angular adjustment of the telescope tube 11 may then be made by rotation of the crank 17 by the crank handle 18. Referring again to Figure 2, the telescope tube 11 at its upper end is provided with a slotted opening 30 closed at its lower end by means of a glass window 31 which is mounted adjacent to a reflecting prism 32 which serves as an equivalent of the reflector employed in sextants and known as an index reflector mirror. The reflecting prism 32 is pivotally mounted on transverse pivots 33, journalled in a bracket 34 carried by a suitable mounting structure secured in the upper end of the telescope tube 11. A gear sector 35 is rigidly secured to the reflector 32 and rotatable therewith and meshes with worm teeth 36 formed on the upper end of a shaft 37 which extends downwardly through a long-drilled passage 38 formed in the tubular member 11 and having a gear 39 mounted on its lower end, the gear meshing with a ring gear 41 secured to a rotatable sleeve 40 knurled on its outer surface for manual rotation relative to the telescope tube 11. Manual rotation of the sleeve 40 causes rotation of the shaft 37 through the medium of the gears 39 and 41 causing the worm teeth 36 on the upper end of the shaft 37 to rotate the gear sector 35 and index reflector 32 about the horizontal pivots 33 so that the index reflector 32 may be tilted about the axis of the pivot 33 to receive incident light from the celestial body and transmit the same by reflection along the optical axis of the telescope tube 11. An illuminated counter mechanism 42 is arranged concentrically with respect to the shaft 37 intermediate its ends and enclosed in a housing 44 within an aperture cut in the side wall of the telescope tube 11, the counter mechanism being provided with manual resetting means 43 adjustable from the exterior of the telescope. The counter mechanism 42 is so connected to the shaft 37 that as the shaft is rotated the counter mechanism 42 indicates the degree of angular tilt of the index reflector 32 about its horizontal axis, the indication of this angular tilting of the reflector serving as the measure of the altitude of the celestial body as hereinafter more particularly described. A sleeve 50 is journalled within the lower portion of the tube 11 and to the lower end of which, the eyepiece or ocular 10a is secured. An annular bevel ring gear 51 is secured to the upper end of the sleeve 50 concentric therewith. Another sleeve member 52 is journalled within the sleeve member 50 adjacent its upper end. A plurality of bevel type planet gears 53 are journalled on pivots carried by the upper end of the sleeve member 52, the planet pinions 53 meshing with the bevel gear 51 on one side thereof and meshing on their upper sides with a bevel type annular ring gear 54 rigidly secured to the tube 11. The sleeve member 52 serves as a support for a dove prism or other type of image erecting prism having its optical axis concentric with the longitudinal axis of the telescope tube 11 and the gears 51, 53, and 54 serving as a differential gear mechanism such that rotation of the telescope tube 11 relative to the sleeve 50 will cause an angular rotation of the sleeve 52 and dove prism 55 in the same direction but with an angular velocity equal to one-half of the angular velocity of rotation of the tube 11 relative to the sleeve member 50, i. e. for 180° of angular rotation of the telescope tube 11 relative to the sleeve 50, the sleeve 52 and dove prism 55 will be rotated through an angle of 90° in the same direction. Adjacent its central portion the tube 11 is surrounded by a sleeve member 57 suitably secured thereto by screws or the like and having a housing 58 bolted to the front portion thereof and a housing 59 bolted to the rear portion thereof, the sleeve 57 and housings 58 and 59 being angularly rotatable in azimuth in unison with the telescope tube 11. The housing 59 serves to enclose a gyroscope 60, the casing of which is suitably transversely journalled as at 61 in a gimbal ring 62 which is rotatable about pivots 63. The gyroscope 60 may be either electrically or pneumatically driven in a manner well known in the art and may be of the self-erecting type, the specific construction of the gyroscope forming no part of the present invention. The gyroscope 60 carries a vertically extending arm 64 having a conventional reticule 65 transversely mounted at its upper end. The reticule 65 may be of any suitable form such as opaque glass plate having transparent cross hairs marked thereon, the reticule being illuminated by means of light transmitted from a light source 66 such as a small electric lamp supported within the upper portion of the casing 59. The image of the reticule 65 serves as an artificial horizon or reference means which per se is well known in the prior art. Under certain conditions, it may be desirable to employ a different form of artificial horizon reference means than the gyroscopically controlled reticule 65, such as provided for example by a bubble formed in a liquid level tube 67 supported in an extension of the housing 59 and adapted to be illuminated by means of a light source 68 such as a small electric lamp supported within the housing.

The optical elements employed in the sextant in accordance with the invention will now be described. As seen in Figure 2, a refracting prism 10 is provided beneath the index reflector 32 adjacent the upper end of the telescope tube 11 and is so situated that it may transmit light reflected from the index reflector 32 along the longitudinal axis of the telescope tube 11. A pair of associated lenses 71 and 72 are arranged concentric with the axis of the tube 11 immediately below the refracting prism 70 so as to bring the light rays transmitted from the index reflector 32 to focus and transmitting the light to an achromatic lens 73 concentrically mounted within the tube 11 intermediate its ends. Light transmitted from the lens 73 passes in parallel rays through clear glass reflecting reflector 74 placed immediately beneath the lens 73 at an angle of 45° to the longitudinal axis of the tube 11 and is suitably secured therein. Light transmitted from the lens 73 through the clear glass reflector 74 passes into the dove prism 55 and from there is transmitted along the axis of the telescope tube 11 to an objective lens 76 mounted concentrically with the axis of the telescope tube 11 secured to the sleeve member 50 and adapted to transmit light to a 45° silvered reflector 77 mounted in the lower portion of the sleeve member 50 and adapted to transmit light to the lenses 78 mounted within the eyepiece 10a with their optical axes at 90° to the longitudinal axis of the sleeve member 50 and telescope tube 11. The image of the gyroscopically controlled reticule 65 is transmitted to a silvered mirror 79 supported by means of a bracket 80 carried by the housing 59 so that the image of the reticule is transmitted substantially perpendicular to the axis of the telescope tube 11. The image reflected by the silvered mirror 79 passes through an inclined clear glass reflector 81, through a similarly inclined clear glass reflector 82 each supported by a horizontal bracket 83 secured within an aperture 84 formed in the telescope tube 11. Light passing through the clear glass reflectors 81 and 82 is projected through the telescope tube 11 transverse to the longitudinal axis thereof and through a pair of lenses 85 and 86 secured in a suitable sleeve member housed within an aperture on the opposite wall of the telescope tube 11 and projecting light on to an inclined silvered mirror 87 supported within the housing 58. Light transmitted to the mirror 87 is received by a second inclined silvered reflector 88 enclosed within the housing 58 and transmitted to an achromatic lens 89 supported within the housing 58 and having its optical axis parallel to the optical axis of the pair of lenses 85 and 86. Light transmitted through the lens 89 impinges in parallel rays through an aperture 90 upon the inclined surface of the clear glass reflector 74 previously noted, to then be reflected into the dove prism 55 along the axis of the telescope tube 11 and from thence to the eyepiece 10a by means of the objective lens 76 and reflector 77 previously described. Under conditions where it is desired to employ the bubble in the fluid level tube 67 as an artificial horizon, the image of the illuminated bubble will be projected vertically downward on to the inclined surface of the clear glass reflector 81 and from there will be transmitted to the eyepiece 10a in the same manner as the image of the gyroscopically controlled reticule as previously described. In order to be able to observe the numerical value of the measured altitude of a celestial body through the eyepiece 10a, the image of the indicia of the illuminated counter mechanism 42 is transmitted from a suitable aperture or slit in the housing 44 enclosing the counter mechanism to an inclined silvered reflector 92 arranged and supported within the telescope tube 11 diametrically opposite the slit or aperture in the housing 44 so that the image of the indicia of the counter mechanism directly opposite the slit in the housing 44 will be transmitted by the mirror 92 to the clear glass reflector 82 to be transmitted parallel with the image of the gyroscopically controlled reticule 65 or the illuminated bubble in the level tube 67 as the case might be.

*Operation*

The schematic diagram illustrating the principle of operation of the panoramic sextant in accordance with the invention is illustrated in Figure 4. Referring to this figure, it will be seen that light transmitted from a distant star or other celestial body S, impinges upon the index reflector or prism 32 which is rotated in azimuth with the telescope tube 11 so that the incident surface of the prism 32 is perpendicular in azimuth to the direction of the incident rays of light from the celestial body. The light reflected from the index reflector or prism 32 is refracted by the prism 70 and brought to a focus by means of the lenses 71 and 72 at a point indicated by the reference numeral 100. The bundles of light rays transmitted from the celestial body S are then transmitted along the axis of the telescope until they impinge upon the lens 73 which is of such a character that the light rays emerge therefrom as parallel rays. By converting the rays of light transmitted from the star or other celestial body into parallel rays, the effect is the same as if the star or celestial body were then located at infinity. The rays of light transmitted from the celestial body through the lens 73 pass through the clear glass reflector 74 without refraction and pass into the dove prism 55 whereupon they emerge in an inverted position parallel with their original direction and pass into the objective lens 76 and after being reflected by the silvered mirror 77 are brought to a focus at an image plane indicated by the reference numeral 102, the image of the celestial body being observed by the eye through the lenses 78 of the eyepiece 10a. It will be obvious that if the reflecting prism 32 is rotated about its horizontal pivotal axis by means of the adjusting mechanism previously described, the image of the celestial body will be shifted on the image of plane 102. It is a well known optical principle that the focal length of any complicated system of lenses and reflectors can be reduced to an equivalent simple lens having a focal length equal to the focal length of the lens system, in other words, there exists a fictitious equivalent lens which is the same focal length to cause an image at the plane 102 equivalent to the optical system comprising the reflector 32, refracting prism 70, dove prism 55, reflector 77 and lenses 71, 72, 73 and 76. As previously described, the image of the gyroscopically controlled reticule 65 is received and reflected by means of a stationary inclined silvered mirror 79 and is transmitted through the lenses 85 and 86 which bring the image to a focus at the point 104, it then being transmitted by silvered reflectors 87 and 88 to the lens 89 which transforms the light into parallel rays in exactly the same manner as the lens 73. Parallel rays of light transmitted from the lens 89 is reflected from the undersurface of the inclined clear glass reflector 74 along an axis substantially parallel with the axis of the telescope tube 11 and from this point into the dove prism 55 and objective lens 76 also to be brought to a focus at the image plane 102. As is well known, the gyroscopically controlled reticule 65 tends to remain parallel with the surface of the earth i. e. becomes a horizontal reference plane similar to the natural horizon and in pitching motion of the telescope and sextant as a whole will cause the image of the reticule to shift vertically along the image plane 102 and as previously explained, the image of the star can be shifted by adjustably tilting the index reflector 32 about its horizontal pivots 33 so that by manually adjusting the tilt of the index reflector 32, it is possible to cause the image of the celestial body to be superimposed on the image of the reticule at the plane 102, the angle of tilt of the index reflector then being a direct measure of the altitude of the celestial body with reference to the gyroscopically controlled base line formed by the image of the reticule 65. In order however to take a proper altitude measurement, it is essential that the effect of pitching of the aircraft be so neutralized that the image of the celestial body on the image plane 102 when once superimposed upon the image of the reticule 65 will not thereafter change, i. e. while both of the images may shift if they shift together an equal amount in the same direction when once superimposed, they will thereafter remain superimposed and the angle of tilt necessary to cause superimposition of the images will be a true measure of the altitude of the celestial body irrespective of the pitching motion of the aircraft. This desirable effect may be accomplished by designing the focal length of the optical system for transmitting the image of the celestial body to the image plane 102 equal to the focal length of the fictitious equivalent lens of the optical system including reflectors 79, 87, 88, 74, 77 and lenses 85, 86, 89 and 76 and dove prism 55 forming a second optical system and for transmitting the image of the reticule 65 to the image plane 102 and further making the focal length of each of these equivalent lenses equal to the radius of rotation R of the reticule 65 about the pivotal axis 61 of the gimbal ring 62. When this condition is satisfied, the angular shift of the image of the reticule 65 on the image plane 102 due to longitudinal pitching of the aircraft will be exactly equal to and in the same direction as the angular shift of the image of the celestial body due to the pitching of the aircraft so that all that is necessary is that the observer adjust the angle of tilt of the index reflector 32 by means of the tilt-adjusting mechanism previously described with reference to Figure 2 until the images of the celestial body and of the gyroscopically controlled reticule 65 are superimposed and then the angle of tilt as measured by the counter mechanism 42 will be a true measure of the altitude of the celestial body relative to the artificial horizon formed by the reticule 65. When the illuminated bubble in the level tube 67 is employed in place of the gyroscopically controlled reticule 65 as an artificial horizon, it is only necessary that the radius of curvature of the level tube be made equal to the radius of rotation R of the gyroscopically controlled reticule 65 in order to cause an equal shift in the image of the celestial body and the image of the bubble to thus obtain the same results with either type of artificial horizon. In order to facilitate the measurement of altitude, the angular tilt of the index reflector 32 about its pivotal axis 33 necessary to cause superimposed images, is reflected from the illuminated counter mechanism 42 by means of the silvered mirror 92 and clear glass mirror 82 to be transmitted along the same axis as the image of the artificial horizon previously described with reference to Figure 2. Thus the image of the indicia of the counter mechanism 42 corresponding to the angular tilt of the index reflector will also appear on the image plane 102 along with the images of the celestial body and artificial horizon, so that the observer by rotation of the sleeve 40 (Figure 2) adjusts the angle of tilt of the index reflector 32 and observes the indication thereof without removing his eye from the eyepiece 10a (Figure 2).

It is well known in conjunction with the optical characteristics of periscopes and the like that the images observed will become inverted as the telescope is rotated relative to the eyepiece, and the same is true in the present instrument, so that in order to prevent an inversion of the images as observed through the eyepiece 10a (Figure 2) as the telescope 10 is rotated in azimuth to receive light from a particular celestial body, the rotatable erecting prism 55 is provided and as is well known in the art, if a dove prism such as the prism 55, is rotated along with the telescope but through an angular extent equal to one-half of the angular rotation of the telescope, the images transmitted through the dove prism will remain erect and this result is obtained by means of the differential gearing 51, 53, and 54 previously described, i. e. as the observer holds the eyepiece fixed and rotates the telescope in azimuth until a particular celestial body is observed, the dove prism 55 will rotate in the same direction as the telescope through an angle equal to one-half of the angular rotation of the telescope, thus maintaining the observed images continuously erect, i. e. the image of the celestial body, the artificial horizon, and the illuminated countermechanism 42 will remain continuously erect irrespective of relative rotation between the eyepiece 10a and the telescope 11. To obtain the relative azimuth bearing of the celestial body with respect to the longitudinal axis of the aircraft, the observer simply notes the position of the stationary or index pointer 13a relative to the azimuth scale 13 (Figure 2).

While in the preferred form of the instrument as illustrated the means constituting an artificial horizon is rotated in azimuth with the telescope, it is obvious by a suitable construction the artificial horizon could be maintained stationary.

While a preferred form of the invention has been illustrated in the drawings, it will be obvious to those skilled in the art that other modifications and changes may be made therein falling within the scope of the invention as defined by the appended claims.

We claim:

1. A panoramic sextant for aircraft and the like comprising a fixed support, a telescope journalled in said support for rotation in azimuth about its optical axis, said telescope having an aperture for receiving light from a celestial body, an ocular associated with said telescope, reflecting means adjacent said aperture for reflecting light from said celestial body along the axis of said telescope, means for rotating said reflecting means about a horizontal axis, a first optical system for forming a real image of said celestial body within said telescope observable through said ocular, means constituting an artificial horizon including a reference element, a second optical system for forming an image of said reference element within said telescope coplanar with the image of said celestial body and observable through said ocular, indicating means for indicating the rotation of said telescope in azimuth relative to the fixed support and indicating means for indicating the amount of angular rotation of said reflecting means about a horizontal axis necessary to cause the images of said celestial body and the reference element of said artificial horizon to be superimposed, the angular rotation of said reflecting means about a horizontal axis being a measure of the altitude of said celestial body.

2. The structure as claimed in claim 1, including means for maintaining the image of said celestial body viewed through said ocular erect irrespective of the rotation of said telescope in azimuth.

3. The structure as claimed in claim 1, including a rotatable erecting prism for maintaining the image of said celestial body viewed through said ocular erect irrespective of the rotation of said telescope in azimuth.

4. The structure as claimed in claim 1, including a rotatable erecting prism for maintaining the image of said celestial body viewed through said ocular erect irrespective of the rotation of said telescope in azimuth and means actuated by rotation of said telescope in azimuth for rotating said erecting prism about its optical axis an amount equal to one-half of the azimuth displacement of said telescope and in the same direction as the azimuth displacement of said telescope.

5. The structure as claimed in claim 1, including optical means common to said first and said second optical systems for maintaining the image of said celestial body and said reference element erect irrespective of the rotation of said telescope in azimuth.

6. The structure as claimed in claim 1, including a rotatable erecting prism common to said first and said second optical systems and means actuated by rotation of said telescope in azimuth for rotating said prism about its optical axis an amount equal to one-half of the azimuth displacement of said telescope and in the same direction as the azimuth displacement of said telescope.

7. The structure as claimed in claim 1, in which the focal lengths of the equivalent lens of said first and said second optical systems are respectively equal to the radius of rotation of the reference element of said artificial horizon upon tilting of the axis of said telescope out of the true vertical.

8. The structure as claimed in claim 1, in which the means constituting an artificial horizon comprises a gyroscopically stabilized illuminated reticule.

9. The structure as claimed in claim 1, in which the means constituting an artificial horizon comprises an illuminated bubble in a fluid level tube carried by said telescope.

10. A sextant for observing the altitude of a celestial body located at any point within the visible celestial hemisphere comprising a supporting frame, a telescope journalled in said frame for rotation in azimuth about its optical axis, said telescope including an ocular, an artificial horizon device carried by said telescope and rotatable in azimuth therewith, said artificial horizon device including a reference element, a first optical system for forming an image of said reference element on an image plane within said telescope for observation through said ocular, said telescope including a reflector element rotatable therewith in azimuth, means for rotating said reflector element about a horizontal axis to transmit incident light from said celestial body along the optical axis of said telescope, a second optical system for transmitting light from said reflector to form an image of said celestial body on the said image plane within said telescope and observable through said ocular, said first and said second optical systems being so correlated to each other and to the radius of rotation of the reference element of said artificial horizon device that the image of said celestial body may be superimposed on the image of said reference element by rotary adjustment of said reflector about a horizontal axis and said images will remain superimposed irrespective of pitching of said telescope out of the vertical, indicating means for indicating the angular rotation of said reflector about a horizontal axis in terms of the altitude of said celestial body, an erecting prism common to each of said optical systems for maintaining the images viewed through said ocular erect irrespective of the rotation of said telescope in azimuth relative to said ocular and indicating means for indicating the rotation of said telescope in terms of the relative bearing of said celestial body with respect to the fixed reference axis.

CARL J. CRANE.
THOMAS L. THURLOW.
SAMUEL M. BURKA.